(12) United States Patent
Pozin et al.

(10) Patent No.: US 8,048,562 B2
(45) Date of Patent: Nov. 1, 2011

(54) LITHIUM CELL WITH IMPROVED IRON DISULFIDE CATHODE

(75) Inventors: Michael Pozin, Brookfield, CT (US); Il-Seok Kim, Ridgefield, CT (US)

(73) Assignee: The Gillette Company, Boston, MA (US)

( * ) Notice: Subject to any disclaimer, the term of this patent is extended or adjusted under 35 U.S.C. 154(b) by 393 days.

(21) Appl. No.: 12/383,774

(22) Filed: Mar. 27, 2009

(65) Prior Publication Data

US 2010/0248011 A1 Sep. 30, 2010

(51) Int. Cl.
*H01M 2/00* (2006.01)
(52) U.S. Cl. ............... 429/209; 429/163; 429/218.1; 429/221; 429/231.95
(58) Field of Classification Search .......... 429/209, 429/163, 218.1, 221, 231.95
See application file for complete search history.

(56) References Cited

U.S. PATENT DOCUMENTS

| | | | |
|---|---|---|---|
| 4,794,057 A | 12/1988 | Griffin | |
| 4,913,988 A | 4/1990 | Langan | |
| 4,952,330 A | 8/1990 | Leger | |
| 4,959,281 A | 9/1990 | Nishi | |
| 5,229,227 A | 7/1993 | Webber | |
| 5,290,414 A | 3/1994 | Marple | |
| 5,432,030 A | 7/1995 | Vourlis | |
| 5,514,491 A | 5/1996 | Webber | |
| 5,698,176 A | 12/1997 | Capparella | |
| 6,218,054 B1 | 4/2001 | Webber | |
| 6,280,883 B1 | 8/2001 | Lamanna | |
| 6,849,360 B2 | 2/2005 | Marple | |
| 6,866,965 B2 | 3/2005 | Lee | |
| 7,157,185 B2 | 1/2007 | Marple | |
| 2005/0233214 A1 | 10/2005 | Marple | |
| 2005/0244706 A1 | 11/2005 | Wu | |
| 2005/0277023 A1 | 12/2005 | Marple | |
| 2006/0019161 A1 | 1/2006 | Issaev | |
| 2006/0046152 A1 | 3/2006 | Webber | |
| 2006/0046153 A1 | 3/2006 | Webber | |
| 2006/0046154 A1 | 3/2006 | Webber | |
| 2006/0228620 A1 | 10/2006 | Martinson | |
| 2007/0202409 A1 | 8/2007 | Yamakawa | |
| 2008/0026296 A1 | 1/2008 | Bowden | |
| 2008/0050654 A1 | 2/2008 | Stevanovic | |
| 2008/0088278 A1 | 4/2008 | Issaev | |

FOREIGN PATENT DOCUMENTS

| | | |
|---|---|---|
| EP | 0529802 B1 | 4/2000 |
| WO | WO 2008/012776 A2 | 1/2008 |

*Primary Examiner* — Jane Rhee
(74) *Attorney, Agent, or Firm* — Vladimir Vitenberg

(57) ABSTRACT

A primary cell having an anode comprising lithium or lithium alloy and a cathode comprising iron disulfide ($FeS_2$) with calcium hydroxide $Ca(OH)_2$ and lithium carbonate $Li_2CO_3$ additive mixed therein. The electrolyte may typically comprise lithium bistrifluoromethylsulfonyl imide, $Li(CF_3SO_2)_2N$ (LiTFSI) salt dissolved in a solvent mixture comprising 1,3-dioxolane and sulfolane. The electrolyte typically contains between about 100 and 2000 parts by weight water per million parts by weight (ppm) electrolyte therein. A cathode slurry is prepared comprising iron disulfide powder with $Ca(OH)_2$ and $Li_2CO_3$ mixed therein, carbon, binder, and a liquid solvent. The mixture is coated onto a conductive substrate and solvent evaporated leaving a dry cathode coating on the substrate. The anode and cathode can be spirally wound with separator therebetween and inserted into the cell casing with electrolyte then added.

24 Claims, 4 Drawing Sheets

LITHIUM CELL WITH IMPROVED IRON DISULFIDE CATHODE

FIELD OF THE INVENTION

The invention relates to a lithium primary cell having an anode comprising lithium metal or lithium alloy and a cathode comprising iron disulfide with calcium hydroxide and lithium carbonate additives, and an electrolyte comprising a lithium salt and solvents.

BACKGROUND

Primary (non-rechargeable) electrochemical cells having an anode of lithium are known and are in widespread commercial use. The anode is comprised essentially of lithium metal. Such cells typically have a cathode comprising manganese dioxide, and electrolyte comprising a lithium salt such as lithium trifluoromethane sulfonate ($LiCF_3SO_3$) dissolved in an organic solvent. The cells are referenced in the art as primary lithium cells (primary $Li/MnO_2$ cells) and are generally not intended to be rechargeable. Alternatively, primary lithium cells with lithium metal anodes but having different cathodes are also known. Such cells, for example, have cathodes comprising iron disulfide ($FeS_2$) and are designated $Li/FeS_2$ cells. The iron disulfide ($FeS_2$) is also known as pyrite. The $Li/MnO_2$ cells or $Li/FeS_2$ cells are typically in the form of cylindrical cells, typically AA size or AAA size cells, but may be in other size cylindrical cells. The $Li/MnO_2$ cells have a voltage of about 3.0 volts which is twice that of conventional $Zn/MnO_2$ alkaline cells and also have higher energy density (watt-hrs per $cm^3$ of cell volume) than that of alkaline cells. The $Li/FeS_2$ cells have a voltage (fresh) of between about 1.2 and 1.8 volts which is about the same as a conventional $Zn/MnO_2$ alkaline cell. However, the energy density (watt-hrs per $cm^3$ of cell volume) of the $Li/FeS_2$ cell is higher than a comparable size $Zn/MnO_2$ alkaline cell. The theoretical specific capacity of lithium metal is high at 3861.4 mAmp-hr/gram and the theoretical specific capacity of $FeS_2$ is 893.6 mAmp-hr/gram. The $FeS_2$ theoretical capacity is based on a 4 electron transfer from 4Li per $FeS_2$ molecule to result in reaction product of elemental iron Fe and $2Li_2S$. That is, 2 of the 4 electrons change the oxidation state of +2 for $Fe^{+2}$ in $FeS_2$ to 0 in elemental iron ($Fe^0$) and the remaining 2 electrons change the oxidation state of sulfur from −1 in $FeS_2$ to −2 in $Li_2S$.

Overall the $Li/FeS_2$ cell is much more powerful than the same size $Zn/MnO_2$ alkaline cell. That is, for a given continuous current drain, particularly at higher current drain over 200 milliAmp, the voltage is flatter for longer periods for the $Li/FeS_2$ cell than the $Zn/MnO_2$ alkaline cell as may be evident in a voltage vs. time discharge profile. This results in a higher energy output obtainable from a $Li/FeS_2$ cell compared to that obtainable for a same size alkaline cell. The higher energy output of the $Li/FeS_2$ cell is more clearly and more directly shown in graphical plots of energy (Watt-hrs) versus continuous discharge at constant power (Watts) wherein fresh cells are discharged to completion at fixed continuous power outputs ranging from as little as 0.01 Watt to 5 Watt. (As the cell's voltage drops during discharge the load resistance is gradually decreased, raising the current drain to maintain a fixed constant power output.) The graphical plot Energy (Watt-Hrs) versus Power Output (Watt) for the $Li/FeS_2$ cell is above that for the same size alkaline cell. This is despite that the starting voltage of both cells (fresh) is about the same, namely, between about 1.2 and 1.8 volt.

Thus, the $Li/FeS_2$ cell has the advantage over same size alkaline cells, for example, AAA, AA, C or D size or any other size cell in that the $Li/FeS_2$ cell may be used interchangeably with the conventional $Zn/MnO_2$ alkaline cell and will have greater service life, particularly for higher power demands. Similarly the $Li/FeS_2$ cell which is a primary (nonrechargeable) cell can also be used as a replacement for the same size rechargeable nickel metal hydride cell, which has about the same voltage (fresh) as the $Li/FeS_2$ cell. Thus, the primary $Li/FeS_2$ cell can be used to power digital cameras, which require operation at high pulsed power demands.

The cathode material for the $Li/FeS_2$ cell may be initially prepared in a form such as a slurry mixture (cathode slurry), which can be readily coated onto the metal substrate by conventional coating methods. The electrolyte added to the cell must be a suitable organic electrolyte for the $Li/FeS_2$ system allowing the necessary electrochemical reactions to occur efficiently over the range of high power output desired. The electrolyte must exhibit good ionic conductivity and also be sufficiently stable, that is non reactive, with the undischarged electrode materials (anode and cathode components) and also non-reactive with the discharge products. This is because undesirable oxidation/reduction side reactions between the electrolyte and electrode materials (either discharged or undischarged) could thereby gradually contaminate the electrolyte and reduce its effectiveness or result in excessive gassing. This in turn can result in a catastrophic cell failure. Thus, the electrolyte used in $Li/FeS_2$ cell in addition to promoting the necessary electrochemical reactions, should also be stable to discharged and undischarged electrode materials. Additionally, the electrolyte should enable good ionic mobility and transport of the lithium ion ($Li^+$) from anode to cathode so that it can engage in the necessary reduction reaction resulting in $Li_2S$ product in the cathode.

An electrode composite is formed with a sheet of lithium, a sheet of cathode composite containing the $FeS_2$ active material and separator therebetween. The electrode composite may be spirally wound and inserted into the cell casing, for example, as shown in the spirally wound lithium cell of U.S. Pat. No. 4,707,421. A cathode coating mixture for the $Li/FeS_2$ cell is described in U.S. Pat. No. 6,849,360. A portion of the anode sheet is typically electrically connected to the cell casing which forms the cell's negative terminal. The cell is closed with an end cap which is insulated from the casing. The cathode sheet can be electrically connected to the end cap which forms the cell's positive terminal. The casing is typically crimped over the peripheral edge of the end cap to seal the casing's open end. The cell may be fitted internally with a PTC (positive thermal coefficient) device or the like to shut down the cell in case the cell is exposed to abusive conditions such as short circuit discharge or overheating.

The electrolyte used in a primary $Li/FeS_2$ cells is formed of a "lithium salt" dissolved in an "organic solvent". Representative lithium salts which may be used in electrolytes for $Li/FeS_2$ primary cells are referenced in related art, for example, as in U.S. Pat. No. 5,290,414 and include such salts as: Lithium trifluoromethanesulfonate, $LiCF_3SO_3$ (LiTFS); lithium bistrifluoromethylsulfonyl imide, $Li(CF_3SO_2)_2N$ (LiTFSI); lithium iodide, LiI; lithium bromide, LiBr; lithium tetrafluoroborate, $LiBF_4$; lithium hexafluorophosphate, $LiPF_6$; lithium hexafluoroarsenate, $LiAsF_6$; $Li(CF_3SO_2)_3C$, and various mixtures. In the art of $Li/FeS_2$ electrochemistry lithium salts are not always interchangeable as specific salts work best with specific electrolyte solvent mixtures, and specific solvent mixtures with certain lithium salts can lead to significantly improved performance.

In U.S. Pat. No. 5,290,414 (Marple) is reported use of a beneficial electrolyte for $FeS_2$ cells, wherein the electrolyte comprises a lithium salt dissolved in a solvent comprising 1,3-dioxolane (DX) in admixture with a second solvent which is an acyclic (non cyclic) ether based solvent. The acyclic (non cyclic) ether based solvent as referenced may be dimethoxyethane (DME), ethyl glyme, diglyme and triglyme, with the preferred being 1,2-dimethoxyethane (DME). As given in the example the dioxolane and 1,2-dimethoxyethane (DME) are present in the electrolyte in substantial amount, i.e., 50 vol % 1,3-dioxolane (DX) and 40 vol % dimethoxyethane (DME) or 25 vol % 1,3-dioxolane (DX) and 75 vol. % dimethoxyethane (DME) (col. 7, lines 47-54). A specific lithium salt ionizable in such solvent mixture(s), as given in the example, is lithium trifluoromethane sulfonate, $LiCF_3SO_3$. Another lithium salt, namely lithium bistrifluoromethylsulfonyl imide, $Li(CF_3SO_2)_2N$ is also mentioned at col. 7, line 18-19. The reference teaches that a third solvent may optionally be added selected from 3,5-dimethylisoxazole (DMI), 3-methyl-2-oxazolidone, propylene carbonate (PC), ethylene carbonate (EC), butylene carbonate (BC), tetrahydrofuran (THF), diethyl carbonate (DEC), ethylene glycol sulfite (EGS), dioxane, dimethyl sulfate (DMS), and sulfolane (claim 19), with the preferred being 3,5-dimethylisoxazole.

In U.S. Pat. No. 6,218,054 (Webber) is disclosed an electrolyte solvent system wherein dioxolane-based solvent and dimethoxyethane-based solvent are present in a weight ratio of about 1:3 (1 part by weight dioxolane to 3 parts by weight dimethoxyethane).

In U.S. Pat. No. 6,849,360 B2 (Marple) is disclosed an electrolyte for an $Li/FeS_2$ cell, wherein the electrolyte comprises the salt lithium iodide dissolved in the organic solvent mixture comprising 1,3-dioxolane (DX), 1,2-dimethoxyethane (DME), and small amount of 3,5 dimethylisoxazole (DMI). (col. 6, lines 44-48.) This reference discloses an anode of lithium alloyed with aluminum.

In US 2007/0202409 A1 (Yamakawa) it is stated with reference to the electrolyte solvent for the $Li/FeS_2$ cell at para. 33: "Examples of the organic solvent include propylene carbonate, ethylene carbonate, 1,2-dimethoxy ethane, γ-butyrolactone, tetrahydrofuran, 2-methyltetrahydrofuran, 1,3-dioxolane, sulfolane, acetonitrile, dimethyl carbonate, and dipropyl carbonate, and any one of them or two or more of them can be used independently, or in a form of a mixed solvent." Such statement is misleading, since the art teaches only specific combinations of electrolyte solvents will be workable for the $Li/FeS_2$ cell depending on the particular lithium salt to be dissolved in the solvent. (See, e.g. above U.S. Pat. No. 5,290,414 and U.S. Pat. No. 6,849,360) The reference Yamakawa does not teach which combination of solvents from the above list are to be used with any given lithium salt.

In U.S. 2006/0046152 (Webber) is disclosed an electrolyte system for a lithium cell which may have a cathode comprising $FeS_2$ and FeS therein. The disclosed electrolyte contains lithium iodide salt dissolved in a solvent system comprising a mixture of 1,2-dimethoxypropane and 1,2-dimethoxyethane.

The choice of a particular organic solvent or mixture of different organic solvents for use in conjunction with any one or more lithium salts to produce a suitable electrolyte for the $Li/FeS_2$ cell is challenging. This is not to say that the cell with various combinations of lithium salt and solvent mixtures may not work at all, but it may not work well enough to be practical. The challenge associated with such cells using an electrolyte formed with just any combination of lithium salt and known organic solvent suitable for dissolution and ionization of the salt is that the problems encountered will likely be very substantial, thus making the cell impractical for commercial usage. The history of development of lithium cells in general, whether lithium primary cells, e.g. non rechargeable $Li/MnO_2$ or $Li/FeS_2$ cells or rechargeable lithium or lithium ion cells reveals that just any combination of lithium salt and organic solvent cannot be expected to result in a good cell, that is, exhibiting good, reliable performance. Thus, references which merely provide long lists of possible organic solvents for $Li/FeS_2$ cells do not necessarily teach combinations of solvents or combination of specific lithium salts in specific solvent mixtures, which exhibit particular or unexpected benefit.

An effective electrolyte for the $Li/FeS_2$ cell promotes ionization of the lithium salt in the electrolyte and is sufficiently stable that it does not degrade with time and does not degrade the anode or cathode components. The effective electrolyte comprises a lithium salt dissolved in an organic solvent mixture which provides good ionic mobility of the lithium ions through the electrolyte so that the lithium ions may pass at good transport rate from anode to cathode through the separator.

The iron disulfide is purchased in the form of a powder. It has exposure to atmospheric air and moisture during transit and storage. This results in contaminants, which include mostly acids and Fe containing salts, forming on the surfaces and within the pores of the $FeS_2$ particles. The contaminants include acids and Fe containing salts such as FeS, $H_2S$, $H_2SO_4$, $H_2SO_3$, $FeSO_4$, $FeSO_4$ $nH_2O$ (hydrate). If these contaminants are present in the cathode, they can react directly with electrolyte or cell components to significantly interfere with proper performance of the cell. It has been determined that if the $FeS_2$ particles are heat treated in a nitrogen atmosphere prior to their use in the cathode mixture, the level of contaminants can be reduced. But it has been found that the contaminants can gradually reform and reappear on the $FeS_2$ surfaces when the heat treated particles are subsequently placed in storage with exposure to atmospheric air and moisture. In a cell assembly operation it is not practical to heat treat the $FeS_2$ particles and use the heat treated $FeS_2$ particles immediately in forming the cathode slurry without exposing them to atmospheric air and moisture prior to forming the slurry.

Conventional $FeS_2$ powders, for example Pyrox Red 325 powder from Chemetall GmbH, are conventionally available with pH raising additives therein to offset or retard any buildup in acidity of the powder. Such additives are believed to contain calcium carbonate ($CaCO_3$). Such calcium carbonate is added to the $FeS_2$ powder to retard the formation of acidic impurities within or on the surface of the powder as it is stored in ambient air and exposed to oxygen and moisture. This is regardless of whether the $FeS_2$ is intended for use in cathode mixtures or other applications, for example, as an additive in manufacture of car brakes.

The addition of pH raising additive such as calcium carbonate ($CaCO_3$) or calcium carbonate containing compounds to the $FeS_2$ powder, however, tends to cause agglomeration of the $FeS_2$ particles when the $FeS_2$ powder is stored in ambient air. Such agglomeration of the $FeS_2$ powder can significantly interfere with attainment of the expected level of performance from $Li/FeS_2$ cells. Also, the calcium carbonate or calcium carbonate containing compound additives has the disadvantage that such compounds get carried into the $FeS_2$ cathode mixture. The calcium carbonate acts merely as an insulator within the cathode, that is, it is not electrochemically active and does not render the cathode more conductive. In other words the calcium carbonate takes up a certain amount of volume within the cathode that might otherwise be used for $FeS_2$ active material. If calcium carbonate is admixed with $FeS_2$ to raise pH it may typically comprise up to about 2.5 percent (maximum) by weight of the mixture. However, calcium carbonate is less dense than $FeS_2$. The bulk density ratio of $FeS_2$ to $CaCO_3$ is about 1.66. That is, 2.5 grams of calcium carbonate has the same volume as 4.15 grams $FeS_2$. Thus for every 2.5 grams of calcium carbonate present in the cathode there are 4.15 grams less $FeS_2$ active material that can be included in the cathode.

In U.S. Pat. No. 4,913,988 (Langan) is discussed the use of the combination of additives $Li_2CO_3$ and $Ca(OH)_2$ which are mixed into the cathode of a nonaqueous cell. The $Li_2CO_3$ may comprise between about 0.5 to about 2 percent, preferably about 1 percent by weight of the cathode and the $Ca(OH)_2$ may comprise between about 0.5 and 6 percent, preferably 1.3 percent by weight of cathode. The nonaqueous cell may have an active metal anode, for example, lithium metal (claim 4). Manganese dioxide is indicated as the preferred cathode active material for the nonaqueous cell. (col. 3, lines 14-15) The reference focuses on the nonaqueous cell having a lithium anode and cathode comprising principally manganese dixoide ($Li/MnO_2$ cell) and adding the $Li_2CO_3$ and $Ca(OH)_2$ to the manganese dioxide cathode. However, the reference also mentions that such nonaqueous cells may be employed with other cathode materials, for example, iron sulfide (theoretical discharge capacity of 893 mAh per gram) or copper oxide (theoretical discharge capacity of 674 mAh per gram). In any event the reference is specific that the cell is a nonaqueous cell. The nonaqueous cell employs an electrolyte which is composed of a salt dissolved in appropriate organic (nonaqueous solvent). (col. 1, lines 26-30). The reference teaches that when manganese dioxide is intended to be used as the cathode active material, the water present in the manganese dioxide can be first removed, by heating it in air or inert atmosphere at a temperature of about 350° C. for about 8 hours. (col. 4, lines 4-10) The reference indicates that the $Li_2CO_3$ and $Ca(OH)_2$ may be mixed with the manganese dioxide by the "wet process", that is, in the presence of some water. In that case the mixture is subsequently dried by heating it at a temperature of between about 120° C. and 150° C. until sufficiently dry before the mixture is shaped into the desired cathode configuration. It is clear that the final cell containing the $Li_2CO_3$ and $Ca(OH)_2$ cathode additive is a "nonaqueous" cell.

Accordingly, in the present invention it is desired to reduce the rate of buildup of acidic contaminants in the $FeS_2$ powder and thus in effect to extend the storage life of the $FeS_2$ without sacrificing electrochemical cathode capacity. It is desired to reduce the amount of pH raising additive, such as calcium carbonate, that acts merely as an insulator and takes up volume within the cathode, which could otherwise be used for additional $FeS_2$ active material. But at the same time it is desired to add water to the electrolyte for the cell so that the cell is no longer considered a nonaqueous cell.

It is also desired to improve the method of forming the cathode for the $Li/FeS_2$ cell, in particular to reduce the amount of acidic contaminants carried into the cell by the $FeS_2$ powder.

It is desired to produce a primary (nonrechargeable) $Li/FeS_2$ cell having good rate capability that the cell may be used in place of rechargeable batteries to power digital cameras.

SUMMARY OF THE INVENTION

The invention is directed to lithium primary cells wherein the anode comprises lithium metal. The lithium metal may be alloyed with small amounts of other metal, for example aluminum, or calcium which typically comprises less than about 1 or 2 wt. %, and even up to about 5 wt. % of the lithium alloy. Thus, the term "lithium" or "lithium metal" as used herein shall be understood to include such lithium alloy. The lithium which forms the anode active material, is preferably in the form of a thin foil. The cell has a cathode comprising the cathode active material iron disulfide ($FeS_2$), commonly known as "pyrite". Desirably, the cell may be cylindrical, comprising a spirally wound electrode assembly therein. The electrode assembly is formed of an anode sheet and a cathode composite sheet spirally wound with separator therebetween. The cathode composite sheet is formed by coating a cathode slurry mixture comprising iron disulfide ($FeS_2$) particles onto a substrate, preferably a conductive metal substrate. The cathode slurry coating on the conductive substrate is then predried to evaporate the solvents therein to form a dry cathode composite sheet (dried cathode coating on the substrate), which is calendered to compact the coating. The calendered cathode composite is then subjected to baking in accordance with an aspect of the invention. The electrode spiral comprising anode sheet, baked cathode composite sheet with separator therebetween is formed and inserted into the cell casing and electrolyte then added.

A principal aspect of the invention is directed to an improved method for forming the cathode composite, that is, the cathode coating comprising iron disulfide ($FeS_2$), carbon, and binder material coated onto a conductive substrate. The method of the invention has the advantage of significantly reducing, if not eliminating, the amount of contaminants that may be present in the iron disulfide ($FeS_2$) particles and cathode coating on the conductive substrate, prior to forming the wound electrode assembly for insertion into the cell casing.

Prior to forming the cathode it has been determined that the storage life of the $FeS_2$ powder can be extended by admixing $FeS_2$ powder with lithium carbonate ($Li_2CO_3$) and calcium hydroxide ($Ca(OH)_2$) buffer. The mixture of lithium carbonate ($Li_2CO_3$) and calcium hydroxide ($Ca(OH)_2$) acts as a buffer raising the pH of the $FeS_2$ and maintaining the pH of the $FeS_2$ at elevated level, that is, above 5. Unless otherwise specified the term pH as used herein and in the claims shall be the pH as measured by ASTM D-1512 method.

It is desired to premix the lithium carbonate ($Li_2CO_3$) and calcium hydroxide ($Ca(OH)_2$) buffer into the $FeS_2$ powder as soon as possible after the $FeS_2$ powder has been synthesized or purchased unbuffered from the supplier, that is, obtained from the supplier without buffer additives therein. Alternatively, it would also be convenient to have the supplier premix the $FeS_2$ powder with the $Ca(OH)_2$ plus $Li_2CO_3$ buffer additive. Thus, the $FeS_2$ powder may be received from the supplier with the desired amount $Ca(OH)_2$ plus $Li_2CO_3$ buffer, needed in the cathode (typically between about 0.5 and 1.5 wt % based on the weight of $FeS_2$), already premixed into the $FeS_2$ powder). Such mixture protects the $FeS_2$ from buildup of acidic contaminants on the $FeS_2$ particle surface during storage. Graphite (and also acetylene black) which may also be in the final cathode mixture, may optionally also be premixed into the $FeS_2$ powder along with the $Ca(OH)_2$ plus $Li_2CO_3$ buffer additive or may be added at a later time.

It has been determined that premixing the $FeS_2$ powder in this manner with the required amount of lithium carbonate ($Li_2CO_3$) and calcium hydroxide ($Ca(OH)_2$) serves to prevent or retard the rate of buildup of acidic contaminants on the surface of the $FeS_2$ particles during storage of the $FeS_2$ powder. The total amount of lithium carbonate ($Li_2CO_3$) plus calcium hydroxide ($Ca(OH)_2$) in admixture with the $FeS_2$ is desirably between about 0.1 and 4 percent by weight based on the weight of $FeS_2$, preferably between about 0.5 and 1.5 percent by weight based on the weight of $FeS_2$. The weight ratio of lithium carbonate ($Li_2CO_3$) to calcium hydroxide ($Ca(OH)_2$) is desirably between about 20:1 and 1:20. The lithium carbonate ($Li_2CO_3$) and calcium hydroxide ($Ca(OH)_2$) appears to cover much of the $FeS_2$ surface thus reducing the amount of $FeS_2$ surface area exposed to the ambient atmosphere. This provides a degree of added protection for the $FeS_2$ particles from contamination because of exposure to the ambient air. Although the mixture of lithium carbonate ($Li_2CO_3$) and calcium hydroxide ($Ca(OH)_2$) is a preferred mixture to protect the surface of the $FeS_2$ particles, either the lithium carbonate ($Li_2CO_3$) or calcium hydroxide ($Ca(OH)_2$) may be used alone or with calcium carbonate ($CaCO_3$) added to either the $Li_2CO_3$ or $Ca(OH)_2$ or with the $CaCO_3$ added to the mixture of $Li_2CO_3$ and $Ca(OH)_2$. The average particle size of the $FeS_2$ is desirably between about 6 and 30 micron, preferably between about 10 and 25 micron.

The premixture of $FeS_2$ powder with lithium carbonate ($Li_2CO_3$) and calcium hydroxide ($Ca(OH)_2$) may be further protected by storing the mixture in sealed aluminum foil bags or containers filled with nitrogen or other inert gas (e.g. helium, argon, neon or krypton) therein or in air under partial vacuum conditions until ready for use in forming the cathode mixture. The $FeS_2$ as mixed with lithium carbonate ($Li_2CO_3$) and calcium hydroxide ($Ca(OH)_2$) can also be subjected to heat treatment, if desired just prior to forming the cathode, in order to further remove any residual acidic contaminants. However, it has generally been found to be sufficient to store the mixture of $FeS_2$ with the lithium carbonate and calcium hydroxide additive mixed therein in sealed bags or containers at ambient conditions with the mixture exposed to ambient atmospheric air contained within the bags or containers.

A principal aspect of the invention is directed to reducing the rate of buildup of acidic contaminants within $FeS_2$ powder as the powder is stored prior to use in forming cathodes for $Li/FeS_2$ cells. When prepared by the method of the invention, the cathode comprising $FeS_2$ particles with the lithium carbonate and calcium hydroxide additive mixed therein exhibits reduced acidic contaminant content at the time the cathode is inserted into the cell casing. The electrolyte is then added to the cell as soon as possible after the cathode is inserted into the cell. The electrolyte prevents exposure of the $FeS_2$ particles to air and moisture, in turn preventing formation of the contaminants on the $FeS_2$ surface.

In the method of the invention the $FeS_2$ particles do not have to be pretreated by subjecting them to preheating before adding the calcium hydroxide and lithium carbonate additives. However, such pretreatment of the $FeS_2$ may optionally be included. The cathode may be formed by the method of the invention as follows:

a) Obtain $FeS_2$ powder preferably without any pH raising additives therein and add a mixture of calcium hydroxide and lithium carbonate buffers to the $FeS_2$ powder. Processes for mixing of $FeS_2$ with the buffers may include but not limited to a roll mill mixing in a cylindrical container for extended period. Alternatively, the $FeS_2$ powder may be obtained from the supplier with the buffers already premixed therein. The $FeS_2$ powder need not have other pH raising additives, that is, other than a mixture of calcium hydroxide and lithium carbonate mixed therein. The calcium hydroxide and lithium carbonate buffer comprises not more than 5 wt % of the mixture (typically between about 0.5 and 1.5 wt % based on the weight of $FeS_2$). Store the mixture of said $FeS_2$ powder and the buffers in sealed bags or sealed container at ambient temperature with ambient atmospheric air trapped within the container until desired to prepare a cathode slurry. The mixture is stored as a dry or substantially dry mixture for a period of at least about 30 days. Optionally graphite and acetylene black may be mixed into the $FeS_2$ powder with the calcium hydroxide and lithium carbonate added therein before the mixture is stored. Preferably, store the mixture of said $FeS_2$ powder and the calcium hydroxide and lithium carbonate in a sealed aluminum foil bag or sealed container in an atmosphere of air under partial vacuum conditions or in an inert atmosphere of nitrogen, helium, argon, neon, or krypton, or mixtures thereof until ready for use in preparing the cathode slurry.

b) Form a cathode slurry comprising $FeS_2$ particles, buffers (calcium hydroxide and lithium carbonate), carbon particles, binder, and binder solvent, preferably by adding graphite (Timrex KS6 from Timcal), and elastomeric binder Kraton G1651 dissolved in binder solvent to the mixture of $FeS_2$ powder and the buffers and apply the cathode slurry to a side of a conductive substrate;

c) Dry the cathode slurry, for example, in a convective air oven or the like, to form a dry or substantially dry cathode coating on the substrate;

d) Optionally, apply the cathode slurry also to the opposite side of the conductive substrate and if so then drying step (c) is repeated; and e) Calender the dried cathode coating to compress its thickness on the substrate; and f) optionally bake the dried cathode coating on the conductive substrate in a partial vacuum air pressure (or an inert atmosphere of helium, argon, neon, or krypton or mixtures thereof), to assure further reduction of any acid contaminant content in the dry cathode coating. (The term "partial vacuum pressure" as used herein shall be understood to mean below atmospheric pressure. The term "substantially dry coating" as used herein shall mean a coating that is a solid mass which is dry or moist to finger touch.)

The cathode coating on the conductive substrate may be baked in step (f) at elevated temperatures between about 250° C. and 375° C., preferably between about 290° C. and 350° C. for a period between about 2 and 24 hours. (See commonly assigned U.S. application Ser. 11/901,214, filed Sep. 14, 2007.) Such baking may be extended for up to about 3 to 4 days. After the baked cathode has cooled, the wound electrode assembly, which includes the baked cathode, anode sheet and separator therebetween, may be formed and inserted into the cell casing. Electrolyte is then added to the cell as soon as possible thereafter, preferably in less than about 24 hours. The baked cathode or wound electrode assembly can be stored for a period in sealed foil bags with nitrogen or other inert gas therein or in air or other atmosphere under partial vacuum conditions prior to insertion into the cell casing. Alternatively, the wound electrode assembly prior to or after insertion into the cell casing, may be stored in a dry room atmosphere having low relative humidity for a period up to about 24 hours. Electrolyte is then added to the cell covering the cathode with electrolyte.

A desirable electrolyte comprises lithium bistrifluoromethylsulfonyl imide, $Li(CF_3SO_2)_2N$ (LiTFSI) salt (0.5 to 1.2 moles per liter) dissolved in a solvent mixture comprising 1,3-dioxolane (60 to 90 vol %), and sulfolane (10 to 40 vol %), with between about 500 and 1000 ppm pyridine added. A preferred electrolyte of such composition for the $Li/FeS_2$ cell with cathode as above described comprises a lithium bistrifluoromethylsulfonyl imide, $Li(CF_3SO_2)_2N$ (LiTFSI) salt (0.8 moles per liter) dissolved in a solvent mixture comprising 1,3-dioxolane (80 vol %), and sulfolane (20 vol %), with about 800 ppm pyridine added to retard dioxolane polymerization.

Another desirably electrolyte for $Li/FeS_2$ cell with cathode as above described comprises a mixture of lithium salts lithium iodide (LiI) (0.5 to 1.2 moles per liter) and lithium trifluoromethanesulfonate, $LiCF_3SO_3$ (LiTFS)(0.05 to 1.0 wt % based on total electrolyte) dissolved in a solvent mixture of 1,3-dioxolane (50 to 90 wt %) and 1,2-dimethoxyethane (10 to 50 wt %) with 3,5-dimethylisoxazole (0.1 to 5 wt %, typically 0.1 to 1 wt %) added. A preferred electrolyte of such composition for $Li/FeS_2$ cell with cathode as above described comprises a mixture of lithium salts lithium iodide (LiI) (1.0 moles per liter) and lithium trifluoromethanesulfonate, $LiCF_3SO_3$ (LiTFS) (0.1 wt % based on total electrolyte) dissolved in a solvent mixture of 70 wt % 1,3-dioxolane and 30 wt % 1,2-dimethoxyethane with about 0.2 wt % 3,5-dimethylisoxazole added to retard dioxolane polymerization.

The water content in the electrolytes for the $Li/FeS_2$ cell may typically be less than about 100 parts water per million parts total electrolyte. However, based on favorable test results reported herein utilizing the lithium carbonate ($Li_2CO_3$) and calcium hydroxide ($Ca(OH)_2$) mixed into the $FeS_2$ cathode together with electrolyte having added water content, it has been determined that the water content in the electrolyte may typically be above 100 ppm, for example, between about 200 and 600 ppm and higher. For example, water (deionized) may be added to the electrolyte solvents so that the water content in the electrolyte for the $Li/FeS_2$ cell may be up to about 1000 ppm and even up to about 2000 ppm. (See commonly assigned patent application Ser. No. 12/009,858, Filed Jan. 23, 2008.) Thus, the water content in the electrolyte when the lithium carbonate ($Li_2CO_3$) and calcium hydroxide ($Ca(OH)_2$) is added to the $FeS_2$ in the cathode may be between about 100 and 1000 ppm, for example, between about 500 and 1000 ppm, or between about 600 and 1000 ppm and up to about 2000 ppm, for example, between about 600 and 2000 ppm. A preferred level of water content in the electrolyte is between about 100 and 600 ppm, for example, between about 200 and 600 ppm.

DETAILED DESCRIPTION

Figure 1:
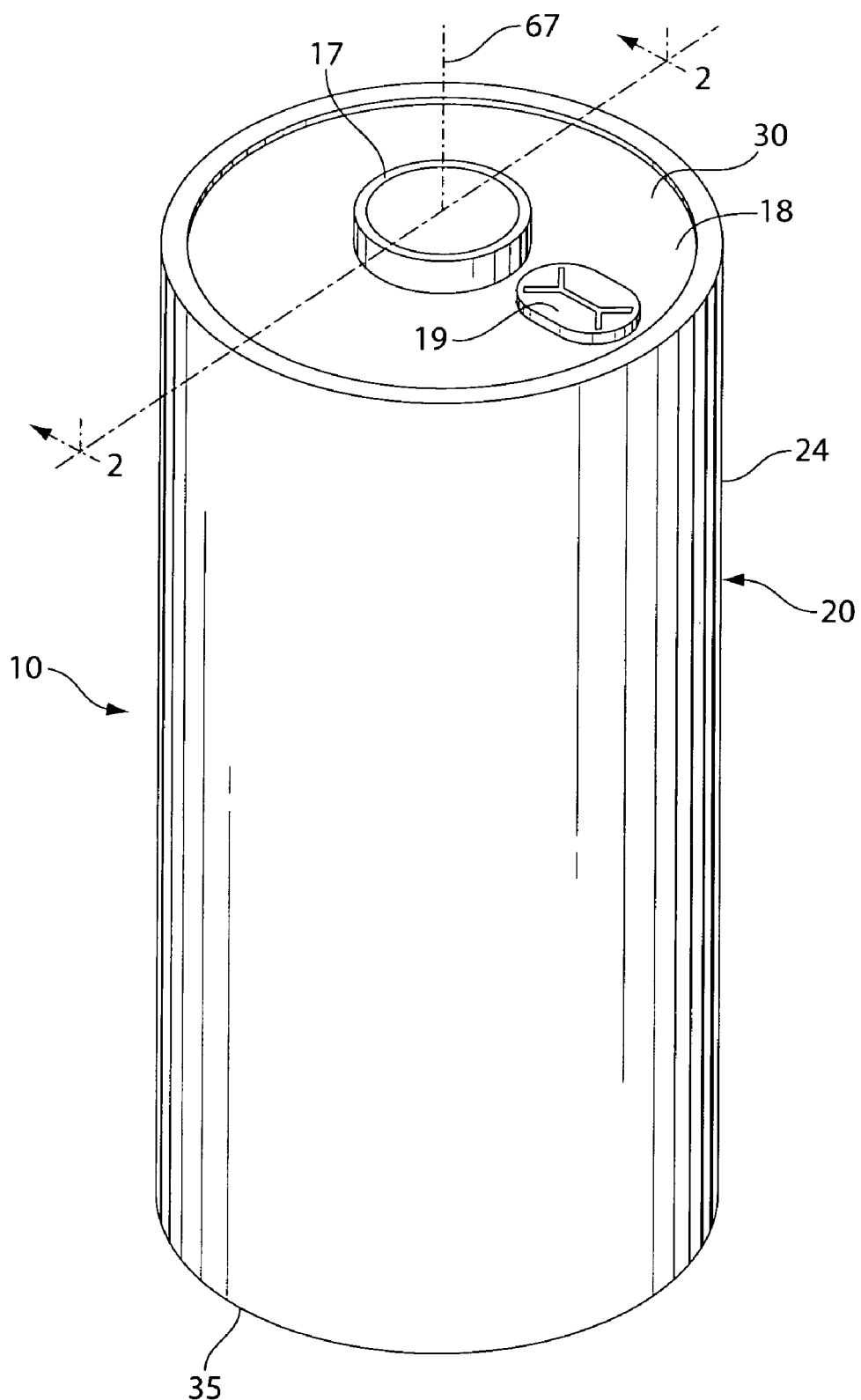
FIG. 1 is an isometric view of an improved $Li/FeS_2$ cell of the invention as presented in a cylindrical cell embodiment.

The cylindrical cell 10 may have a spirally wound electrode assembly 70 (FIG. 3) comprising anode sheet 40, cathode composite 62 with separator sheet 50 therebetween as shown in FIGS. 2-5. The $Li/FeS_2$ cell 10 internal configuration, apart from the difference in cathode composition, may be similar to the spirally wound configuration shown in and described in U.S. Pat. No. 6,443,999. The anode sheet 40 as shown in the figures comprises lithium metal and the cathode sheet 60 comprises iron disulfide ($FeS_2$) commonly known as "pyrite". The cell is preferably cylindrical as shown in the figures and may be of any size, for example, AAAA (42×8 mm), AAA (44×9 mm), AA (49×12 mm), C (49×25 mm) and D (58×32 mm) size. Thus, cell 10 depicted in FIG. 1 may also be a 2/3 A cell (35×15 mm) or other cylindrical size. However, it is not intended to limit the cell configuration to cylindrical shape. Alternatively, the cell of the invention may have a spirally wound electrode assembly formed of an anode comprising lithium metal and a cathode comprising iron disulfide ($FeS_2$) made as herein described inserted within a prismatic casing, for example, a rectangular cell having the overall shape of a cuboid. The $Li/FeS_2$ cell is not limited to a spirally wound configuration but the anode and cathode, for example, may be placed in stacked arrangement for use in coin cells as above indicated.

Figure 3:
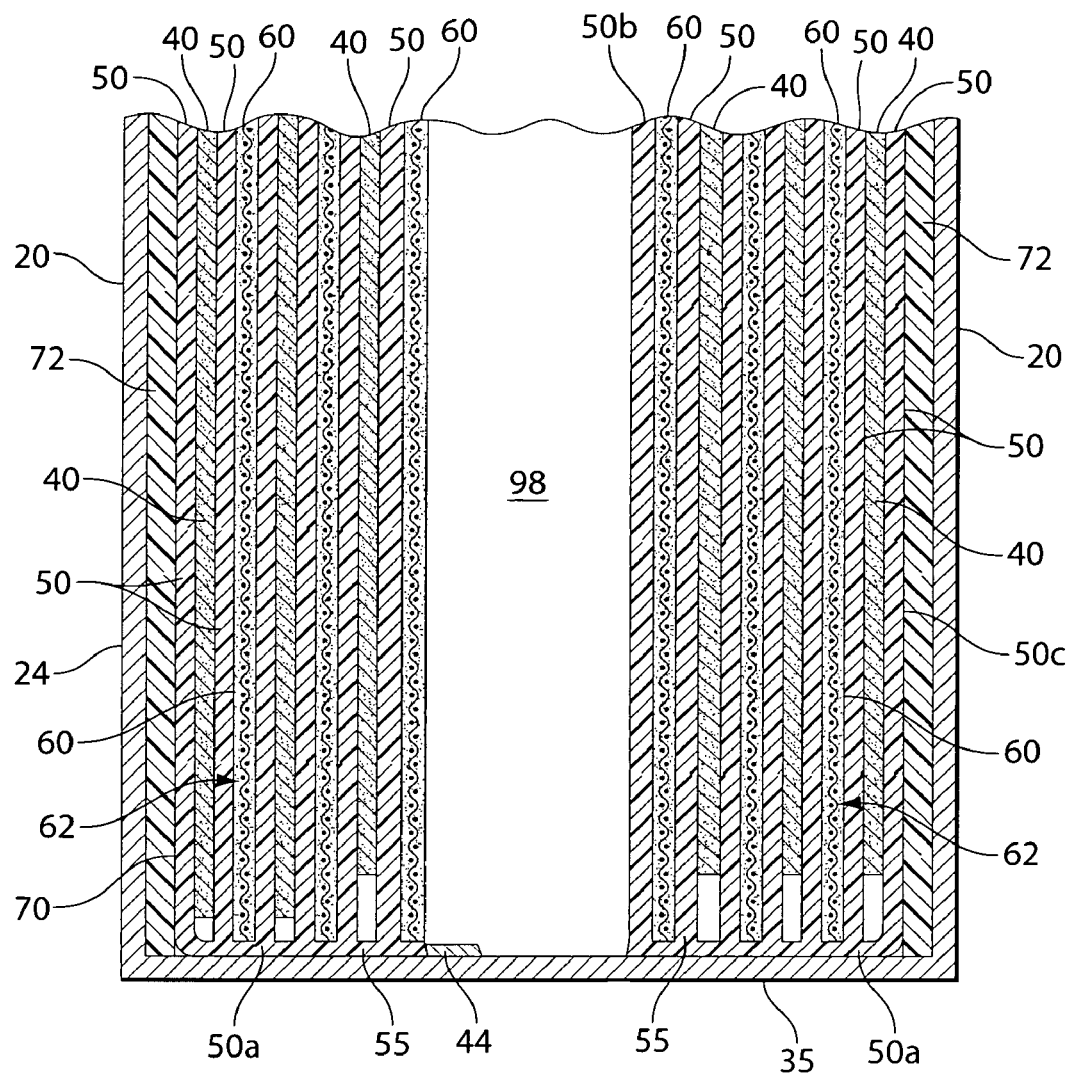
FIG. 3 is a partial cross sectional elevation view of the cell taken through sight lines 2-2 of FIG. 1 to show a spirally wound electrode assembly.
Figure 4:
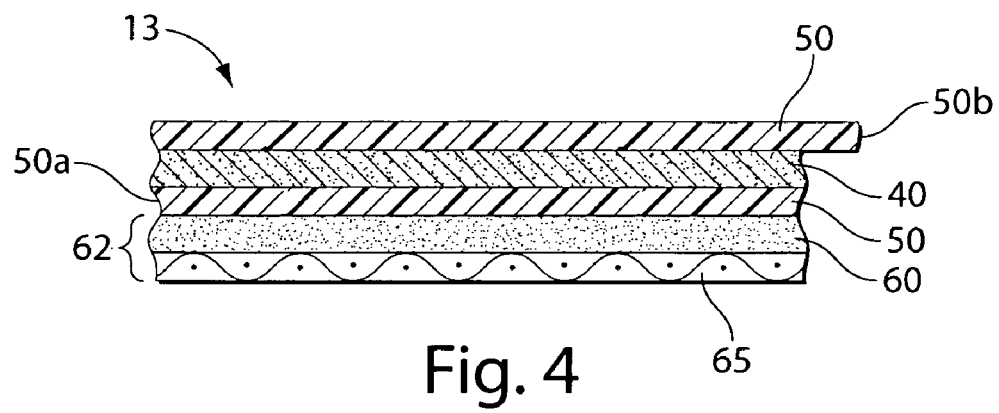
FIG. 4 is a schematic showing the placement of the layers comprising the electrode assembly.
Figure 5:
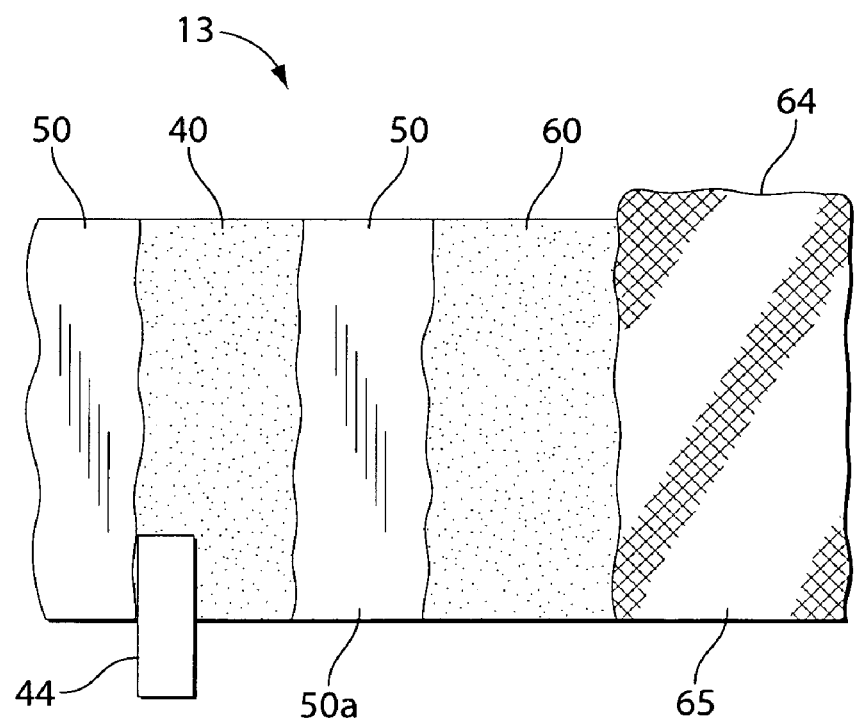
FIG. 5 is a plan view of the electrode assembly of FIG. 4 with each of the layers thereof partially peeled away to show the underlying layer.

For a spirally wound cell, a preferred shape of the cell casing (housing) 20 is cylindrical as shown in FIG. 1. Casing 20 is preferably formed of nickel plated steel. The cell casing 20 (FIG. 1) has a continuous cylindrical surface. The spiral wound electrode assembly 70 (FIG. 3) comprising anode 40 and cathode composite 62 with separator 50 therebetween can be prepared by spirally winding a flat electrode composite 13 (FIGS. 4 and 5). Cathode composite 62 comprises a layer of cathode 60 comprising iron disulfide ($FeS_2$) coated onto metallic substrate 65 (FIG. 4).

The electrode composite 13 (FIGS. 4 and 5) can be made in the following manner: In accordance with the method of the invention the cathode 60 comprising iron disulfide ($FeS_2$) powder dispersed therein can be initially prepared in the form of a wet slurry which is coated onto at least one side of conductive substrate sheet 65, preferably a sheet of aluminum or stainless steel which may be a solid sheet with or without apertures therethrough, to form a cathode composite sheet 62 (FIG. 4). Conventional roll coating techniques may be used to coat the wet slurry onto a side of conductive substrate 65 (FIGS. 4 and 5). If an aluminum sheet 65 is used it may be a solid sheet of aluminum without openings therethrough or may be a sheet of expanded or perforated aluminum foil with openings therethrough thus forming a grid or screen. The apertures in substrate sheet may be the result of punching or piercing holes therein.

The wet cathode slurry mixture having the composition shown above in Table I comprising iron disulfide ($FeS_2$), binder, conductive carbon and solvents is prepared by mixing the components shown in Table I until a homogeneous mixture is obtained.

A preferred cathode slurry mixture is presented in Table I:

TABLE I

| Cathode Composition | | |
|---|---|---|
|  | Wet Cathode Slurry (wt. %) | Dry Cathode (wt. %) |
| Binder (KRATON G1651) | 2.0 | 3.01 |
| Hydrocarbon Solvent (ShellSol A100) | 13.4 | 0.0 |
| (ShellSol OMS) | 20.2 | 0.0 |
| $FeS_2$ Powder | 58.9 | 88.71 |
| Graphite (Timrex KS6) | 4.8 | 7.23 |
| Acetylene Carbon Black (Super P) | 0.7 | 1.05 |
| Total | 100.0 | 100.00 |

The above quantities of components (Table I) of course can be scaled proportionally so that small or large batches of cathode slurry can be prepared. The wet cathode slurry thus preferably has the following composition: $FeS_2$ powder (58.9 wt. %); Binder, Kraton G1651 (2 wt. %); Graphite, Timrex KS6 (4.8 wt %), Acetylene Black, Super P (0.7 wt %), Hydrocarbon Solvents, ShellSol A100 (13.4 wt %) and ShellSol OMS (20.2 wt %).

The $FeS_2$ powder may be obtained from the supplier with a $CaCO_3$ buffer additive already mixed into the $FeS_2$ powder. The $CaCO_3$ may typically comprise up to 1.5 wt. % of the $FeS_2$ powder. The $CaCO_3$ (or $CaCO_3$ containing compound) is added by the supplier to raise the pH of the $FeS_2$ in order to extend its storage life. That is, the elevated pH of $FeS_2$ resulting from the addition of $CaCO_3$ is intended to retard the rate of buildup of acidic contaminants within or on the surface of the $FeS_2$ particles as the $FeS_2$ is exposed to or stored in ambient air. Such $FeS_2$ powder is available, for example, as Pyrox Red 325 powder from the supplier, Chemetall GmbH. The $FeS_2$ Pyrox Red 325 powder has a particle size sufficiently small that the particles will pass through a sieve of Tyler mesh size 325 (sieve openings of 0.045 mm). (The residue amount of $FeS_2$ particles not passing through the 325 mesh sieve is 10% max.) However, it has been determined herein that a more effective approach is to obtain an unbuffered $FeS_2$ from a supplier, for example Chemetall GmbH, and add a buffer comprising $Ca(OH)_2$ plus $Li_2CO_3$ to the $FeS_2$. The $FeS_2$ preferably has a mean average particle size between about 6 and 30 micron, preferably between about 10 and 25 micron. The total of the $Ca(OH)_2$ plus $Li_2CO_3$ may comprise between about 0.1 and 4 percent by weight, preferably between about 0.5 and 1.5 percent by weight based on the weight of $FeS_2$. The weight ratio of $Ca(OH)_2$ to $Li_2CO_3$ is desirably between about 20:1 and 1:20. The $FeS_2$ with the added $Ca(OH)_2$ plus $Li_2CO_3$ may be left in storage for long periods, for example, for at least several months, for example, up to about 6 months and even longer at ambient conditions, that is with exposure to ambient air. The $Ca(OH)_2$ plus $Li_2CO_3$ buffer additive prevents or retards formation of $H_2S$, $H_2SO_4$ and other acidic components on the surface of the $FeS_2$ particles and thus protects the $FeS_2$ during storage. Surprisingly, experimental data herein has indicated that the presence of lithium carbonate ($Li_2CO_3$) and calcium hydroxide ($Ca(OH)_2$) additive to the $FeS_2$ in the cathode has a beneficial effect on cell's discharge performance even though the cell contains added water. The added water may be in the form of water added to the electrolyte in amount as above indicated, for example, between 100 and 1000 ppm, for example, between about 500 and 1000 ppm, or between about 600 and 1000 ppm and up to about 2000 ppm, for example, between about 600 and 2000 ppm.

When it is desired to prepare the wet cathode slurry, the premix of $FeS_2$ powder and $Ca(OH)_2$ plus $Li_2CO_3$ buffer additive is removed from storage and made ready for admixture with binder and solvent solution. The mixture is stirred with graphite, binder and solvent until a homogenous mixture is obtained, thus forming the wet cathode slurry.

The cathode slurry desirably comprises 2 to 4 wt % of binder (Kraton G1651 elastomeric binder from Kraton Polymers, Houston Tex.); 50 to 70 wt % of active $FeS_2$ powder; 4 to 7 wt % of conductive carbon (carbon black and graphite); and 25 to 40 wt % of solvent(s). (The carbon black may include in whole or in part acetylene black carbon particles. Thus, the term carbon black as used herein shall be understood to extend to and include carbon black and acetylene black carbon particles.) The Kraton G1651 binder is an elastomeric block copolymer (styrene-ethylene/butylene (SEBS) block copolymer) which is a film-former. This binder possesses sufficient affinity for the active $FeS_2$ and carbon black particles to facilitate preparation of the wet cathode slurry and to keep these particles in contact with each other after the solvents are evaporated. The $FeS_2$ powder may have an average particle size between about 1 and 100 micron, desirably between about 6 and 30 micron, for example, between about 10 and 25 micron. The graphite is available under the trade designation Timrex KS6 graphite from Timcal Ltd. Timrex graphite is a highly crystalline synthetic graphite. (Other graphites may be employed selected from natural, synthetic, or expanded graphite and mixtures thereof, but the Timrex graphite is preferred because of its high purity.) The carbon black is available under the trade designation Super P conductive carbon black (BET surface area of 62 $m^2/g$) from Timcal Co.

The solvents preferably include a mixture of $C_9$-$C_{11}$ (predominately $C_9$) aromatic hydrocarbons available as ShellSol A100 hydrocarbon solvent (Shell Chemical Co.) and a mixture of primarily isoparaffins (average M.W. 166, aromatic content less than 0.25 wt. %) available as ShellSol OMS hydrocarbon solvent (Shell Chemical Co.). The weight ratio of ShellSol A100 to ShellSol OMS solvent is desirably at a 4:6 weight ratio. The ShellSol A100 solvent is a hydrocarbon mixture containing mostly aromatic hydrocarbons (over 90 wt % aromatic hydrocarbon), primarily $C_9$ to $C_{11}$ aromatic hydrocarbons. The ShellSol OMS solvent is a mixture of isoparaffin hydrocarbons (98 wt. % isoparaffins, M.W. about 166) with less than 0.25 wt % aromatic hydrocarbon content. The slurry formulation may be dispersed using a double planetary mixer. Dry powders are first blended to ensure uniformity before being added to the binder solution in the mixing bowl.

After the wet cathode slurry is formed (Table 1), the wet slurry is then coated onto a side of the conductive substrate 65. The conductive substrate 65 with wet cathode slurry coated thereon is then dried in conventional convective oven (or in inert gas) to evaporate the solvents in the slurry, thereby forming a dry cathode coating 60 on one side of conductive substrate 65 (FIGS. 4 and 5). Preferably the process is repeated, to also coat the opposite side of conductive substrate 65 with the wet cathode slurry (Table 1). The wet cathode slurry on the opposite side of conductive substrate 65 can then be subjected to drying in a convective oven to evaporate solvents, thereby forming a dry cathode coating 60 also on the opposite side of conductive substrate 65. (The test cells are made in this manner.) The drying of the wet cathode slurry coated on the metal substrate 65 is accomplished preferably by gradually adjusting or ramping up the oven temperature (to avoid cracking the coating) from an initial temperature of 40° C. to a final temperature not to exceed 130° C. for about 7-8 minutes or until the solvent has substantially all evaporated. (At least about 95 percent by weight of the solvents are evaporated, preferably at least about 99.9 percent by weight of the solvents are evaporated.) The dry cathode coating 60 (whether applied to only one side or both sides of conductive substrate 65) is then subjected to calendering to compress the thickness of said dry cathode 60, thus forming the completed cathode composite 62 (FIGS. 4 and 5).

The anode 40 can be prepared from a solid sheet of lithium metal or lithium alloy. The anode 40 is desirably formed of a continuous sheet of lithium metal (99.8% pure). The lithium metal in anode 40 may be alloyed with small amounts of other metal, for example aluminum, or calcium which typically comprises less than about 1 or 2 wt. %, and even up to about 5 wt. % of the lithium alloy. The lithium which forms the anode active material, is preferably in the form of a thin foil.

Upon cell discharge the lithium in the alloy thus functions electrochemically as pure lithium. Thus, the term "lithium or lithium metal" as used herein and in the claims is intended to include in its meaning such lithium alloy. The lithium sheet forming anode 40 does not require a substrate. The lithium anode 40 can be advantageously formed from an extruded sheet of lithium metal having a thickness of between about 0.09 and 0.20 mm desirably between about 0.09 and 0.19 mm for the spirally wound cell.

For an AA size $Li/FeS_2$ cell 10 there may typically be between about 4.5 and 5.0 grams of cathode active material, e.g. $FeS_2$ in the cathode. The amount of anode active material, namely, lithium or lithium alloy is determined by balancing the cell based on its theoretical capacity. In general the theoretical capacity of the anode involves computing the ideal capacity (mAmp-hrs) of all the anode active materials therein, and the theoretical capacity of the cathode involves computing the ideal capacity (mAmp-hrs) of all the cathode active materials therein. It shall be understood that the use of such terms theoretical capacity of anode and theoretical capacity of cathode as used in the present application shall be so defined. The "anode active" materials and "cathode active" materials are defined as the materials in the anode and cathode, respectively, which are capable of useful electrochemical discharge. (Only those portions of the anode and cathode with separator therebetween are considered.) That is, the "anode active materials" and "cathode active materials" promote current flow between the cell's negative and positive terminals when an external circuit between these terminals is connected and the cell is used in normal manner. In a wound cylindrical cell 10 wherein the anode active material is lithium metal (or lithium alloy) and the cathode active material is $FeS_2$ the theoretical specific capacity of the anode may be based on lithium at 3861.4 mAmp-hrs/g and the theoretical specific capacity of the cathode may be based on $FeS_2$ at 893.5 mAmp-hrs/g. The wound cylindrical cell 10 utilizing the electrolyte formulation of the invention may be balanced so that either the theoretical capacity (mAmp-hrs) of the anode or cathode is in excess or both are the same. The wound cell may typically be balanced so that the ratio of the theoretical capacity (mAmp-hrs) of the cathode to theoretical capacity of the anode (mAmp-hrs) is between about 1.05 and 1.15. Alternatively, the cell may be balanced so that the theoretical capacity (mAmp-hrs) of the anode to the theoretical capacity of the cathode is between about 1.05 and 1.15.

Individual sheets of electrolyte permeable separator material 50, preferably of microporous polypropylene or polyethylene having a thickness of about 0.025 mm or less, desirably between about 0.008 and 0.025 mm, is inserted on each side of the lithium anode sheet 40 (FIGS. 4 and 5). In a preferred embodiment the separator sheet may be microporous polyethylene or polypropylene of thickness about 1 mil (0.025 mm.) In a preferred embodiment the separator sheet may be microporous polyethylene or polypropylene of thickness about 0.016 mm. The microporous polypropylene desirably has a pore size between about 0.001 and 5 micron. The first (top) separator sheet 50 (FIG. 4) can be designated the outer separator sheet and the second sheet 50 (FIG. 4) can be designated the inner separator sheet. The cathode composite sheet 62 comprising cathode coating 60 on conductive substrate 65 is then placed against the inner separator sheet 50 to form the flat electrode composite 13 shown in FIG. 4. The flat composite 13 (FIG. 4) is spirally wound to form electrode spiral assembly 70 (FIG. 3). The winding can be accomplished using a mandrel to grip an extended separator edge 50b (FIG. 4) of electrode composite 13 and then spirally winding composite 13 clockwise to form wound electrode assembly 70 (FIG. 3).

Figure 2:
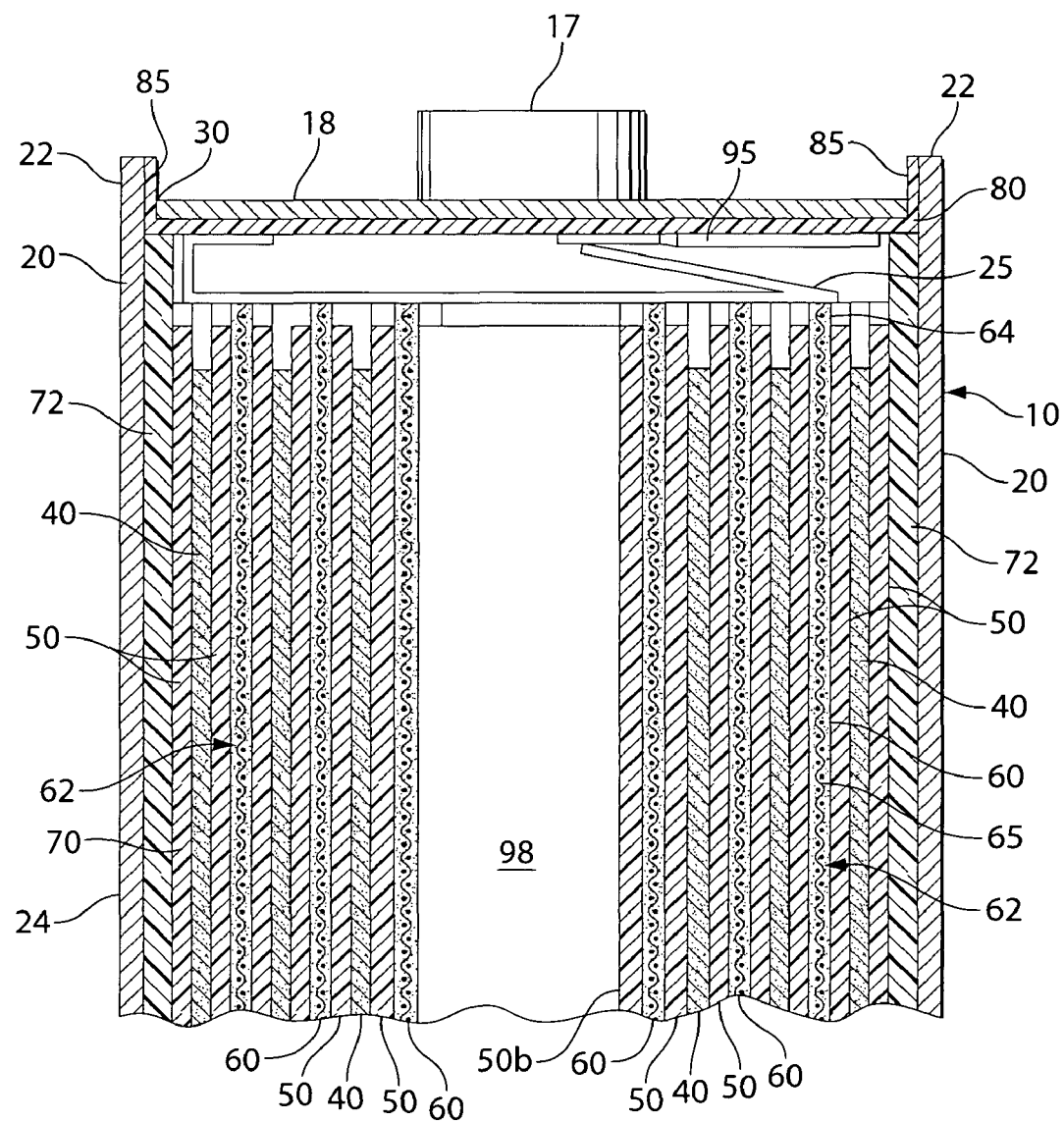
FIG. 2 is a partial cross sectional elevation view of the cell taken through sight lines 2-2 of FIG. 1 to show the top and interior portion of the cell.

When the winding is completed separator portion 50b appears within the core 98 of the wound electrode assembly 70 as shown in FIGS. 2 and 3. By way of non limiting example, the bottom edges 50a of each revolution of the separator may be heat formed into a continuous membrane 55 as shown in FIG. 3 and taught in U.S. Pat. No. 6,443,999. As may be seen from FIG. 3 the electrode spiral 70 has separator material 50 between anode sheet 40 and cathode composite 62. The spirally wound electrode assembly 70 has a configuration (FIG. 3) conforming to the shape of the casing body. The spirally wound electrode assembly 70 is inserted into the open end 30 of casing 20. As wound, the outer layer of the electrode spiral 70 comprises separator material 50 shown in FIGS. 2 and 3. An additional insulating layer 72, for example, a plastic film such as polypropylene tape, can desirably be placed over a of the outer separator layer 50, before the electrode composite 13 is wound. In such case the spirally wound electrode 70 will have insulating layer 72 in contact with the inside surface of casing 20 (FIGS. 2 and 3) when the wound electrode composite is inserted into the casing. Alternatively, the inside surface of the casing 20 can be coated with electrically insulating material 72 before the wound electrode spiral 70 is inserted into the casing.

The electrolyte can be added to the cell casing after the wound electrode spiral 70 is inserted. The electrolyte may typically be added to the wound cell on the basis of about 0.4 gram electrolyte per gram of $FeS_2$. A desirable electrolyte comprises lithium bistrifluoromethylsulfonyl imide, $Li(CF_3SO_2)_2N$ (LiTFSI) salt (0.5 to 1.2 moles per liter) dissolved in a solvent mixture comprising 1,3-dioxolane (60 to 90 vol %), and sulfolane (10 to 40 vol %), with between about 500 and 1000 ppm pyridine added. A preferred electrolyte of such composition for the $Li/FeS_2$ cell with cathode as above described comprises a lithium bistrifluoromethylsulfonyl imide, $Li(CF_3SO_2)_2N$ (LiTFSI) salt (0.8 moles per liter) dissolved in a solvent mixture comprising 1,3-dioxolane (80 vol %), and sulfolane (20 vol %), with about 800 ppm pyridine added to retard dioxolane polymerization.

Another desirably electrolyte for $Li/FeS_2$ cell with cathode as above described comprises a mixture of lithium salts lithium iodide (LiI) (0.5 to 1.2 moles per liter) and lithium trifluoromethanesulfonate, $LiCF_3SO_3$ (LiTFS) (0.05 to 1.0 wt % based on total electrolyte) dissolved in a solvent mixture of 1,3-dioxolane (50 to 90 wt %) and 1,2-dimethoxyethane (10 to 50 wt %) with 3,5-dimethylisoxazole (0.1 to 5 wt %, typically 0.1 to 1 wt %) added. A preferred electrolyte of such composition for $Li/FeS_2$ cell with cathode as above described comprises a mixture of lithium salts lithium iodide (LiI) (1.0 moles per liter) and lithium trifluoromethanesulfonate, $LiCF_3SO_3$ (LiTFS) (0.1 wt % based on total electrolyte) dissolved in a solvent mixture of 70 wt % 1,3-dioxolane and 30 wt % 1,2-dimethoxyethane with about 0.2 wt % 3,5-dimethylisoxazole added to retard dioxolane polymerization.

The water content in the electrolyte of the invention for the wound cell 10 may typically be less than about 100 parts water per million parts total electrolyte. However, it is believed that water (deionized) may be added to the electrolyte solvents so that the water content in the electrolyte may be up to about 1000 ppm and even up to about 2000 ppm. (See commonly assigned patent application Ser. No. 12/009,858, filed Jan. 23, 2008 and experimental tests, Table II, employing buffer additives described in the present application.) Thus, it is believed that the water content in the electrolyte of the present invention may be between about 100 and 1000 ppm, for example, between about 500 and 1000 ppm, or between about 600 and 1000 ppm and up to about 2000 ppm, for example, between about 600 and 2000 ppm.

An end cap 18 forming the cell's positive terminal 17 may have a metal tab 25 (cathode tab) which can be welded on one of its sides to inside surface of end cap 18. Metal tab 25 is preferably of aluminum or aluminum alloy. A portion of the cathode substrate 65 may extend into portion 64 extending from the top of the wound spiral as shown in FIG. 2. The cathode substrate portion 64 can be welded to the exposed side of metal tab 25 before the casing peripheral edge 22 is crimped around the end cap 18 with peripheral edge 85 of insulating disk 80 therebetween to close the cell's open end 30. End cap 18 desirably has a vent 19 which can contain a rupturable membrane designed to rupture and allow gas to escape if the gas pressure within the cell exceeds a predetermined level. Positive terminal 17 is desirably an integral portion of end cap 18. Alternatively, terminal 17 can be formed as the top of an end cap assembly of the type described in U.S. Pat. No. 5,879,832, which assembly can be inserted into an opening in the surface of end cap 18 and then welded thereto.

A metal tab 44 (anode tab), preferably of nickel, or nickel plated steel, can be pressed into a portion of the lithium metal anode 40. Anode tab 44 can be pressed into the lithium metal at any point within the spiral, for example, it can be pressed into the lithium metal at the outermost layer of the spiral as shown in FIG. 5. Anode tab 44 can be embossed on one side forming a plurality of raised portions on the side of the tab to be pressed into the lithium. The opposite side of tab 44 can be welded to the inside surface of the casing either to the inside surface of the casing side wall 24 or more preferably to the inside surface of closed end 35 of casing 20 as shown in FIG. 3. It is preferable to weld anode tab 44 to the inside surface of the casing closed end 35, since this is readily accomplished by inserting an electrical spot welding probe (an elongated resistance welding electrode) into the cell core 98. Care should be taken to avoid contacting the welding probe to the separator starter tab 50b which is present along a portion of the outer boundary of cell core 98.

The primary lithium cell 10 may optionally also be provided with a PTC (positive thermal coefficient) device 95 located under the end cap 18 and connected in series between the cathode 60 and end cap 18 (FIG. 2). Such device protects the cell from discharge at a current drain higher than a predetermined level. Thus, if the cell is drained at an abnormally high current, e.g., higher than about 6 to 8 Amp in a AA size cell for a prolonged period, the resistance of the PTC device increases dramatically, thus shutting down the abnormally high drain. It will be appreciated that devices other than vent 19 and PTC device 95 may be employed to protect the cell from abusive use or discharge.

The $FeS_2$ powder can be premixed with a mixture of calcium hydroxide ($Ca(OH)_2$) and lithium carbonate ($Li_2CO_3$), as desired for the final cathode. Both components raise the pH of the $FeS_2$ powder or prevents the $FeS_2$ from becoming more acidic as it is left in storage, even if the $FeS_2$ powder is stored in ambient air. The mixture of $Ca(OH)_2$ and $Li_2CO_3$ buffer additive has been determined to be more preferable than the same weight of $CaCO_3$ buffer additive to the $FeS_2$ especially when water is added to the electrolyte. This is because the $Ca(OH)_2$ and $Li_2CO_3$ buffer additive to the $FeS_2$ powder results in better cell performance and longer cell service life. Surprisingly, the better cell performance is obtained when $Ca(OH)_2$ and $Li_2CO_3$ are added to the $FeS_2$ powder even though water has also been added to the electrolyte.

A specific preferred electrolyte for the $Li/FeS_2$ cell with cathode as above described comprises a lithium bistrifluoromethylsulfonyl imide, $Li(CF_3SO_2)_2N$ (LiTFSI) salt (0.8 moles per liter) dissolved in a solvent mixture comprising 1,3-dioxolane (80 vol %), and sulfolane (20 vol %), with about 800 ppm pyridine added to retard dioxolane polymerization.

Another specific preferred electrolyte for $Li/FeS_2$ cell with cathode as above described comprises a mixture of lithium salts lithium iodide (LiI) (1.0 moles per liter) and lithium trifluoromethanesulfonate, $LiCF_3SO_3$ (LITFS) (0.1 wt % based on total electrolyte) dissolved in a solvent mixture of 70 wt % 1,3-dioxolane and 30 wt % 1,2-dimethoxyethane with about 0.2 wt % 3,5-dimethylisoxazole added to retard dioxolane polymerization.

The water content in the electrolytes for the $Li/FeS_2$ cell may typically be less than about 100 parts water per million parts total electrolyte. However, based on favorable test results reported herein (Table II) utilizing the calcium hydroxide ($Ca(OH)_2$) and lithium carbonate ($Li_2CO_3$) mixed into the $FeS_2$ cathode, the water content in the total electrolyte may be greater than 100 ppm. Also it is believed that water (deionized) may be added to the electrolyte solvents so that the water content in the electrolyte for the $Li/FeS_2$ cell may be up to about 1000 ppm and even up to about 2000 ppm. (See commonly assigned patent application Ser. No. 12/009,858, Filed Jan. 23, 2008.) Thus, it is believed that the water content in the electrolyte when the calcium hydroxide ($Ca(OH)_2$) and lithium carbonate ($Li_2CO_3$) is added to the $FeS_2$ in the cathode of the present invention may be between about 100 and 1000 ppm, for example, between about 500 and 1000 ppm, or between about 600 and 1000 ppm and up to about 2000 ppm, for example, between about 600 and 2000 ppm. A preferred level of water content in the electrolyte is between about 100 and 600 ppm, for example, between about 200 and 600 ppm.

Surprisingly, improved DIGICAM performance of $Li/FeS_2$ cells with added water to the electrolyte was realized when the cathode contained both $Ca(OH)_2$ and $Li_2CO_3$ additive compared to same cells without water but with standard $CaCO_3$ buffer additive in the cathode. This has led to the conclusion supported by the experimental data herein that the addition of calcium hydroxide ($Ca(OH)_2$) and lithium carbonate ($Li_2CO_3$) and to the $FeS_2$ in the cathode has a beneficial effect on cell's discharge performance even though the cell contains added water. The added water may be in the form of water added to the electrolyte in amount as above indicated, for example, 100 and 1000 ppm, for example, between about 500 and 1000 ppm, or between about 600 and 1000 ppm and up to about 2000 ppm, for example, between about 600 and 2000 ppm.

Experimental Tests

The following is an example showing a comparison in DIGICAM Test Results between a control group (Group A) of AA size $Li/FeS_2$ wound cells and four test groups (Groups B, B1, C, and C1) of AA size $Li/FeS_2$ wound cells. The cells were prepared generally as above described with cathode material 60 coated on both sides of aluminum substrate 65. The cells were of identical construction and same lithium metal anode and same cathode composition (also contained same average $FeS_2$ particle size of 16 micron) and employed the same electrolyte, but the cell groups had the following differences: A standard buffer of $CaCO_3$ (1.5 wt % $CaCO_3$ based on $FeS_2$ weight) was added to the cathode in the control cells Group A. A buffer comprising a mixture of $Ca(OH)_2$ (1.1 wt % based on $FeS_2$ weight) and $Li_2CO_3$ (0.05 wt % based on FeS$_2$ weight) was added to the cathode of the test cell Group B. A buffer comprising a mixture of Ca(OH)$_2$ (0.05 wt % based on FeS$_2$ weight) and Li$_2$CO$_3$ (1.1 wt % based on FeS$_2$ weight) was added to the cathode of the test cell Group C. Additionally, there was prepared a test cell Group B1 which was the same as the Group B cells except that the Group B1 cells had 600 ppm water added to the electrolyte. Also there was prepared a test cell Group C1 which was the same as the Group C cells except that the Group C1 cells had 600 ppm water added to the electrolyte. The electrolyte employed in each of the cell groups was otherwise the same, namely, lithium bistrifluoromethylsulfonyl imide, Li(CF$_3$SO$_2$)$_2$N (LiTFSI) salt (0.8 moles per liter) dissolved in a solvent mixture comprising 1,3-dioxolane (80 vol %), and sulfolane (20 vol %), with 800 ppm pyridine added.

After the AA cells (Groups A, B, B1, C, and C1) were filled, they were all predischarged slightly to a depth of discharge of about 3 percent of the cell's capacity. Some of the cells from Groups A, B, B1, C, and C1 were then stored at room temperature for about 3 days (fresh cells) and then subjected to the DIGICAM test below. These cells are referred to as "fresh cells". The remaining cells from Groups A, B, B1, C, and C1 were stored for 20 days at a temperature of 60° C. and then subjected to the DIGICAM test described below. These cells are referred to as "stored cells". The tests were all performed with multiple cells in each group of fresh cells and multiple cells in each group of stored cells. The DIGICAM test results reported in the following Table II reflect a mean average for each of the indicated groups of fresh and stored cells.

The cell groups were all discharged to a cutoff voltage of about 1.05 Volts using a digital camera discharge test (DIGICAM test). The digital camera test (DIGICAM test) consists of the following pulse test protocol wherein the cells were drained by applying pulsed discharge cycles to the cell: Each cycle consists of both a 1.5 Watt pulse for 2 seconds followed immediately by a 0.65 Watt pulse for 28 seconds. These cycles are repeated 10 times (elapsed time 5 minutes) followed by 55 minutes rest. Then the cycles are repeated until the cutoff voltage is reached. The cycles are continued until a cutoff voltage of 1.05V is reached. The total number of the 1.5 Watt pulses required to reach these cutoff voltages were recorded. The results are reported in Table II (below). The DIGICAM test results (Table II) clearly show that that the cells with the Ca(OH)$_2$ plus Li$_2$CO$_3$ buffer additive (Groups B, B1, C, and C1 cells) resulted in better performance (number of 1.5 Watt pulses to 1.05V cutoff) as measured by the DIGICAM test compared to the control Group A cells which employed CaCO$_3$ as the cathode buffer additive. (Digicam test Comparison with same cells with unbuffered FeS$_2$ were not made, since past experience has proved that cells with totally unbuffered FeS$_2$ do not perform as well after long term storage.)

The improvement in performance (number of 1.5 Watt pulses to 1.05V cutoff) was realized regardless of whether the "fresh cells" were used for comparison or whether the "stored cells" (20 day storage at 60° C.) were used for comparison. Additionally, the Group B1 and C1 cells, both fresh and stored cells, which contained the Ca(OH)$_2$ plus Li$_2$CO$_3$ cathode additive and also 600 ppm (parts per million by weight) of deionized water added to the electrolyte exhibited better DIGICAM performance than the control Group A fresh and stored cells, which employed the CaCO$_3$ cathode additive and zero added water to the electrolyte. Thus, the test cells (Groups B, B1, C, and C1) with Ca(OH)$_2$ plus Li$_2$CO$_3$ cathode additive showed better DIGICAM performance than the control cells (Group A) with CaCO$_3$ cathode additive, regardless of whether or not water was added to the electrolyte of the test cells.

TABLE II

DIGICAM Test Results for Li/FeS$_2$ AA Size Wound Cells Comparing Effect of Ca(OH)$_2$ plus Li$_2$CO$_3$ Cathode Additive Compared to CaCO$_3$ Cathode Additive

| Li/FeS$_2$ AA Size Wound Cells[3] | DIGICAM Test - Number of 1.5 Watt Pulses to 1.05 V Cut Off for Fresh Cells[1] | DIGICAM Test - Number of 1.5 Watt Pulses to 1.05 V Cut Off for Stored Cells[2] |
|---|---|---|
| Control Cells, Group A (1.5 wt % CaCO$_3$ cathode additive)[4] | 562 | 512 |
| Test Cells, Group B (1.1 wt % Ca(OH)$_2$ plus 0.05 wt % Li$_2$CO$_3$ cathode additive)[5] | 625 | 621 |
| Test Cells, Group B1 (1.1 wt % Ca(OH)$_2$ plus 0.05 wt % Li$_2$CO$_3$ cathode additive plus 600 ppm water added to electrolyte)[6] | 612 | 609 |
| Test Cells, Group C (0.05 wt % Ca(OH)$_2$ plus 1.1 wt % Li$_2$CO$_3$ cathode additive)[7] | 649 | 644 |
| Test Cells, Group C1 0.05 wt % Ca(OH)$_2$ plus 1.1 wt % Li$_2$CO$_3$ cathode additive)[8] plus 600 ppm water added to electrolyte[8] | 648 | 624 |

Notes:
[1] Cells stored for 3 days at room temperature (21° C.) before DIGICAM test was applied.
[2] Cells stored for 20 days at 60° C. before DIGICAM test was applied.
[3] Electrolyte was a mixture of Li(CF$_3$SO$_2$)$_2$N (LiTFSI) salt (0.8 moles per liter) dissolved in a solvent mixture comprising 1,3-dioxolane (80 vol %) and sulfolane (20 vol %) with 800 ppm pyridine added.
[4] 1.5 wt % CaCO$_3$ added to cathode based on FeS$_2$ weight.
[5] 1.1 wt % Ca(OH)$_2$ and 0.05 wt % Li$_2$CO$_3$ added to cathode based on FeS$_2$ weight.
[6] 1.1 wt % Ca(OH)$_2$ and 0.05 wt % Li$_2$CO$_3$ added to cathode based on FeS$_2$ weight plus 600 ppm water (deionized) added to electrolyte.
[7] 0.05 wt % Ca(OH)$_2$ and 1.1 wt % Li$_2$CO$_3$ added to cathode based on FeS$_2$ weight.
[8] 0.05 wt % Ca(OH)$_2$ and 1.1 wt % Li$_2$CO$_3$ added to cathode based on FeS$_2$ weight plus 600 ppm water (deionized) added to electrolyte.

The beneficial effect of adding the Ca(OH)$_2$ plus Li$_2$CO$_3$ in admixture with the FeS$_2$ is also illustrated in Table III. Sample mixtures of FeS$_2$ powder (average size 16 micron) with various added chemical buffers were prepared and stored in plastic bags under ambient conditions. The pH of the mixture was tracked with time. The sample mixtures were stored in plastic bags containing considerable ambient atmospheric air therein. Small portions of each sample were removed at month intervals and pH determined. Thus, as may be seen from the following Table III, the combination of Ca(OH)$_2$ and Li$_2$CO$_3$ has a much better pH raising effect on the FeS$_2$ as the mixture is stored month to month over a period of about 6 months when compared to storage of mixtures of FeS$_2$ with CaCO$_3$ buffer added or when compared to storage of FeS$_2$ without any buffer additive. The pH levels reported in Table III are with respect to the same composition of buffer additive given with respect to FeS$_2$ as in the cell groups A, B, and C in Table II. In addition the pH of an unbuffered sample, that is, without any chemical buffer added is also presented in Table III for comparison.

TABLE III

Effect on pH of $FeS_2$ Mixed With Different Buffer Additives[2,3,4]

| Storage[1] Month | pH of unbuffered $FeS_2$ | pH of Sample A ($FeS_2$ plus 1.5 wt % $CaCO_3$) | pH of Sample B ($FeS_2$ plus 1.1 wt % $Ca(OH)_2$ and 0.05 wt % $Li_2CO_3$) | pH of Sample C ($FeS_2$ plus 0.05 wt % $Ca(OH)_2$ and 1.1 wt % $Li_2CO_3$) |
|---|---|---|---|---|
| 0 | 4.7 | 4.8 | 6.4 | 6.6 |
| 1 | 4.2 | 5.0 | 6.1 | 6.7 |
| 2 | 4.2 | 4.6 | 6.05 | 6.4 |
| 3 | 2.9 | 4.3 | 5.8 | 6.1 |
| 6 | 2.7 | 3.6 | 5.6 | 5.6 |

Notes:
[1]The $FeS_2$ in the samples all had a mean average particle size of about 16 micron. The $FeS_2$ in the samples was obtained from the supplier in an unbuffered state, that is, no chemical buffers were added to the $FeS_2$ powder by the supplier. Applicant added the various buffers to the $FeS_2$ as above indicated in samples A, B, and C. The samples were stored in plastic bags under ambient conditions (21° C.) with the samples exposed to considerable ambient atmospheric air present in the bags. Small portions of each sample were removed from the bag at various month intervals and their pH tested.
[2]The samples tested for pH measurement in Table III did not contain added water.
[3]One mole of $CaCO_3$, $Ca(OH)_2$, or $Li_2CO_3$ will theoretically neutralize one mole of $H_2SO_4$ (an acidic contaminant which can form on the surface of the $FeS_2$ particles). However, the molecular weight of $Ca(OH)_2$ or $Li_2CO_3$ is less than the molecular weight of $CaCO_3$, so less mass of $Ca(OH)_2$ and $Li_2CO_3$ is needed to neutralize $H_2SO_4$ assuming the actual efficiency of the neutralization reaction is the same for $CaCO_3$ as the combination of $Ca(OH)_2$ and $Li_2CO_3$.
[4]The pH of the samples was determined using International Standard Method ISO 787/9-1981(E), which is similar to the method defined in ASTM D1512. In preparation for the pH measurement 5 grams of the $FeS_2$ unbuffered sample or 5 grams of the buffered samples A, B, or C was added to 50 milliliters of $CO_2$ free deionized water and the solutions then stirred for 1 minute. In 5 minutes after stirring was stopped, the pH measurement of the respective sample solutions was made (to an accuracy of 0.1 on the pH scale) using a pH meter model IQ240 from IQ Scientific Instruments, Inc.

Conclusion

The pH raising effect of the $Ca(OH)_2$ plus $Li_2CO_3$ on $FeS_2$ in combination was more effective than standard $CaCO_3$ buffer additive to the $FeS_2$ particles. Thus, the $Ca(OH)_2$ plus $Li_2CO_3$ protected the $FeS_2$ and retarded the rate of formation of acidic components on the surface of the $FeS_2$ particles during storage. This resulted in better performance of the $Li/FeS_2$ cells as measured by the DIGICAM Test. It was surprising that improved DIGICAM performance of $Li/FeS_2$ cells with added water to the electrolyte was realized when the cathode contained both $Ca(OH)_2$ and $Li_2CO_3$ additive compared to same cells without water but with standard $CaCO_3$ buffer additive in the cathode.

Although the invention has been described with reference to specific embodiments, it should be appreciated that other embodiments are possible without departing from the concept of the invention and are thus within the claims and equivalents thereof.

What is claimed is:

1. A primary electrochemical cell comprising a housing; a positive and a negative terminal; an anode comprising a lithium metal; a cathode comprising iron disulfide ($FeS_2$), calcium hydroxide ($Ca(OH)_2$) and lithium carbonate ($Li_2CO_3$), and conductive carbon; said cell further comprising an electrolyte inserted therein, said electrolyte comprising a lithium salt dissolved in a solvent mixture comprising the solvent dioxolane and at least one other solvent selected from the group consisting of dimethoxyethane and sulfolane.

2. The cell of claim 1 wherein said lithium salt comprises bistrifluoromethylsulfonyl imide, $Li(CF_3SO_2)_2N$ (LiTFSI) and said at least one other solvent comprises sulfolane.

3. The cell of claim 1 wherein said lithium salt comprises lithium iodide (LiI) and said at least one other solvent comprises dimethoxyethane.

4. The cell of claim 3 wherein said lithium salt further comprises lithium trifluoromethanesulfonate, $LiCF_3SO_3$ (LiTFS).

5. A primary electrochemical cell comprising a housing; a positive and a negative terminal; an anode comprising a lithium metal; a cathode comprising iron disulfide ($FeS_2$), calcium hydroxide ($Ca(OH)_2$) and lithium carbonate ($Li_2CO_3$), and conductive carbon; said cell further comprising an electrolyte inserted therein, said electrolyte comprising a lithium salt dissolved in a solvent mixture comprising the solvent dioxolane and at least one other solvent selected from the group consisting of dimethoxyethane and sulfolane, wherein the water content in said electrolyte is between about 100 and 2000 parts by weight water per million parts by weight electrolyte.

6. The cell of claim 5 wherein said at least one other solvent comprises dimethoxyethane.

7. The cell of claim 5 wherein said lithium salt comprises lithium iodide (LiI) and lithium trifluoromethanesulfonate, $LiCF_3SO_3$ (LiTFS) and said at least one other solvent comprises dimethoxyethane.

8. The cell of claim 5 wherein said at least one other solvent comprises sulfolane.

9. The cell of claim 5 wherein the water content in said electrolyte is between about 600 and 2000 parts by weight water per million parts by weight electrolyte.

10. The cell of claim 5 wherein the water content in said electrolyte is between about 600 and 1000 parts by weight water per million parts by weight electrolyte.

11. The cell of claim 5 wherein the water content in said electrolyte is between about 200 and 600 parts by weight water per million parts by weight electrolyte.

12. The cell of claim 5 wherein said dioxolane comprises 1,3-dioxolane.

13. The cell of claim 5 wherein said dimethoxyethane comprises 1,2-dimethoxyethane.

14. The cell of claim 5 wherein said lithium salt comprises bistrifluoromethylsulfonyl imide, $Li(CF_3SO_2)_2N$ (LiTFSI).

15. The cell of claim 5 wherein said lithium salt comprises lithium iodide (LiI).

16. The cell of claim 5 wherein the iron disulfide ($FeS_2$) has an average particle size between about 6 and 30 micron.

17. The cell of claim 5 wherein the iron disulfide ($FeS_2$) has an average particle size between about 10 and 25 micron.

18. The cell of claim 5 wherein said electrolyte comprises between about 60 and 90 percent by volume dioxolane.

19. The cell of claim 5 wherein the total amount of calcium hydroxide and lithium carbonate in said cathode is between about 0.1 and 4 percent by weight based on the weight of said $FeS_2$ in said cathode.

20. The cell of claim 19 wherein the weight ratio of calcium hydroxide to lithium carbonate is between about 20:1 and 1:20.

21. The cell of claim 5 wherein the total amount of calcium hydroxide and lithium carbonate in said cathode is between about 0.5 and 1.5 percent by weight based on the weight of said $FeS_2$ in said cathode.

22. The cell of claim 21 wherein the weight ratio of calcium hydroxide to lithium carbonate is between about 20:1 and 1:20.

23. The cell of claim 5 wherein said anode and cathode are spirally wound with a separator sheet therebetween.

24. The cell of claim 5 wherein said cathode comprising iron disulfide ($FeS_2$) and conductive carbon is coated onto a substrate sheet comprising aluminum.

* * * * *